US010289147B2

(12) United States Patent
Zils et al.

(10) Patent No.: US 10,289,147 B2
(45) Date of Patent: May 14, 2019

(54) MANUAL CONTROL DEVICE, CONTROL AND OPERATING UNIT INCLUDING A MANUAL CONTROL DEVICE, AND WORK MACHINE OR CONSTRUCTION MACHINE

(71) Applicant: MOBA Mobile Automation AG, Limburg (DE)

(72) Inventors: Boris Zils, Limburg (DE); Thomas Kuehr, Limburg (DE); Karl-Friedrich Trost, Limburg (DE)

(73) Assignee: MOBA MOBILE AUTOMATION AG, Limburg (DE)

( * ) Notice: Subject to any disclaimer, the term of this patent is extended or adjusted under 35 U.S.C. 154(b) by 53 days.

(21) Appl. No.: 15/095,352

(22) Filed: Apr. 11, 2016

(65) Prior Publication Data
US 2016/0306379 A1    Oct. 20, 2016

(30) Foreign Application Priority Data

Apr. 20, 2015 (EP) ..................... 15164311

(51) Int. Cl.
G05G 5/02       (2006.01)
G05G 1/04       (2006.01)
(Continued)

(52) U.S. Cl.
CPC ............. *G05G 5/02* (2013.01); *G01D 5/145* (2013.01); *G05G 1/04* (2013.01); *G05G 1/06* (2013.01);
(Continued)

(58) Field of Classification Search
CPC ........... G05G 1/04; G05G 1/06; G05G 5/005; G05G 5/02; G05G 5/08;
(Continued)

(56) References Cited

U.S. PATENT DOCUMENTS 5,160,918 A    11/1992  Saposnik et al.
6,098,491 A     8/2000  Carlson et al.
(Continued)

FOREIGN PATENT DOCUMENTS

CN    101046699 A    10/2007
CN    101151587 A     3/2008
(Continued)

OTHER PUBLICATIONS

Official Communication issued in Chinese Patent Application No. 201610244746.6, dated Mar. 30, 2017.

*Primary Examiner* — Victor L MacArthur
*Assistant Examiner* — Joseph Brown
(74) *Attorney, Agent, or Firm* — Keating & Bennett, LLP

(57) ABSTRACT

A manual control device for a control and operating unit of a lifting work platform, work machine or construction machine has at least one actuating unit which has an actuation element having at least one magnetic position element, and an evaluating unit having at least one magnetic field sensor unit. The evaluating unit is configured to detect a position and/or movement of the actuation element in a plane of movement based on a sensor signal from the magnetic field sensor unit. The actuation element is movable relative to the sensor unit along a further direction of movement perpendicularly to the plane of movement, wherein the evaluating unit is configured to detect a movement of the actuation element along the further direction of movement based on a sensor signal from the magnetic field sensor unit.

15 Claims, 10 Drawing Sheets

(51) Int. Cl.
*G05G 5/04* (2006.01)
*G05G 1/06* (2006.01)
*G05G 5/08* (2006.01)
*G01D 5/14* (2006.01)
*G05G 9/047* (2006.01)

(52) U.S. Cl.
CPC ............... *G05G 5/04* (2013.01); *G05G 5/08* (2013.01); *G05G 9/047* (2013.01); *G05G 2009/04755* (2013.01); *G05G 2009/04777* (2013.01)

(58) Field of Classification Search
CPC .......... G05G 2009/04755; G05G 2009/04777; G05G 9/047; G05G 9/04737; G05G 5/00; G05G 5/04; G05G 5/05; G05G 5/06
See application file for complete search history.

(56) References Cited

U.S. PATENT DOCUMENTS

| | | | |
|---|---|---|---|
| 6,437,771 B1 * | 8/2002 | Rosenberg | G05G 9/047 345/156 |
| 6,606,085 B1 | 8/2003 | Endo et al. | |
| 6,618,036 B1 * | 9/2003 | Tanaka | G05G 9/047 345/161 |
| 2007/0164996 A1 * | 7/2007 | Gould | G05G 5/005 345/161 |
| 2007/0262959 A1 * | 11/2007 | Gu | G05G 9/047 345/161 |
| 2008/0278448 A1 | 11/2008 | Nilsagard et al. | |
| 2008/0293472 A1 * | 11/2008 | Strawn | G05G 5/005 463/16 |
| 2009/0084214 A1 | 4/2009 | Sakai et al. | |
| 2012/0056761 A1 | 3/2012 | Sano | |
| 2012/0215475 A1 * | 8/2012 | Rutledge | G05G 9/047 702/94 |
| 2014/0251070 A1 | 9/2014 | Komelson | |
| 2015/0020635 A1 * | 1/2015 | Tokuda | G05G 9/047 74/486 |
| 2015/0029101 A1 * | 1/2015 | Shin | G05G 9/047 345/161 |
| 2016/0077543 A1 * | 3/2016 | Conro | G05G 9/047 74/471 XY |
| 2016/0085258 A1 * | 3/2016 | Crandall-Seibert | G05G 5/06 74/526 |

FOREIGN PATENT DOCUMENTS

| | | | |
|---|---|---|---|
| CN | 101443870 A | 5/2009 | |
| CN | 102402240 A | 4/2012 | |
| DE | 199 48 557 A1 | 5/2000 | |
| DE | 103 04 595 B3 | 10/2004 | |
| DE | 20 2010 004 128 U1 | 6/2010 | |
| DE | 20 2012 006 199 U1 | 9/2013 | |
| DE | 202012006199 U1 * | 9/2013 | ......... G05G 9/04792 |
| EP | 1 808 738 A1 | 7/2007 | |
| GB | 2 341 664 A | 3/2000 | |

* cited by examiner

US 10,289,147 B2

MANUAL CONTROL DEVICE, CONTROL AND OPERATING UNIT INCLUDING A MANUAL CONTROL DEVICE, AND WORK MACHINE OR CONSTRUCTION MACHINE

CROSS-REFERENCE TO RELATED APPLICATION

This application claims priority from European Application No. EP15164311.1, which was filed on Apr. 20, 2015, and is incorporated herein by reference in its entirety.

BACKGROUND OF THE INVENTION

The present invention relates to a manual control device for a control and operating unit which is employed in the field of work machines, for example mobile work machines, or construction machines.

Such manual control devices are used as control and operating units in mobile work machines or construction machines, for example for moving a work cage of a lifting work platform or for adjusting a work tool of a construction machine. Thus, the manual control devices and the control and operating units are usually exposed to most adverse environmental conditions, for example rain, dust and extreme temperatures.

DE 20 2010 004 128 U1 describes a manual control device including separate actuation and evaluation, which basically consists of a mechanical part and an electric part. A magnetically transmissive plate, for example a printed circuit board, is provided between the mechanical part and the electric part as a separation layer and fixing layer for the mechanical parts. The electric or electronic part of the manual control device is formed by one or several sensors arranged on the lower side of the plate, for example magnetic field sensors. A lever mechanism detachably arranged on the upper side of the carrier plate with a magnet arranged thereon, which may be replaced as a unit in the case of repair, forms the mechanical part.

DE 103 04 595 B3 describes a switching device comprising at least one movable actuating element which comprises a magnet, and at least one sensor element for detecting the position and/or movement of the actuating element. The actuating element and the sensor element are spaced apart from each other in every position, the sensor element being arranged in or at a casing. The actuating element is part of an actuating unit which is fixed detachably to the casing. The actuating element here is a joystick turnable along at least one axis, the lower end of which carries a magnet. Several sensor elements are arranged on a circuit board in the casing or at the casing, below the turning region of the magnet, in order to identify a position/deflection of the joystick.

The manual control devices from the known technology, including corresponding actuating elements, for example implemented as joysticks, allow moving in one plane of movement, for example the x/y-plane. The acquisition of the movement here, as has been mentioned, takes pace using sensors, for example magnetic field sensors, which acquires a change in position of the magnet within the plane of movement. A corresponding position signal may exemplarily be generated by a controller on the basis of the sensor signals. Furthermore, manual control devices of the type described above are known which allow a movement perpendicularly to the plane of movement, for example a movement in the z-direction or a vertical movement. In such manual control devices, an additional sensor element is necessitated for acquiring the further direction of movement, for example implemented as a potentiometer or a switching contact which detects a vertical movement of the actuating element of the manual control device. In addition to the signals for detecting a movement in the x/y-plane, another signal from a separate sensor element is necessitated.

The implementation of manual control devices described above, including a way of vertical actuation of the joystick, however, is of disadvantage in that additional sensor technology is necessitated for acquiring the vertical movement, which, apart from necessitating the provision of an additional sensor, also makes the setup of the manual control device more complicated due to the additional space necessitated. In addition, this additional sensor is arranged in the region of the actuating unit, that is, in contrast to the magnetic field sensors, is not protected below the plate and thus exposed to the same environmental conditions as is the actuating element. This results in a reduced lifetime of the actuating unit or in the requirement of protecting the sensor or using a sensor of higher quality. The costs of the actuating unit which is replaced regularly are increased by this. Additionally, it is necessitated to evaluate the signals of the various, different sensors in a controller, necessitating the controller to be implemented correspondingly in order to be able to process the signals of different sensors.

Starting from this known technology, it is the object of the present invention to develop a manual control device for control and operating units of work machines or construction machines further such that actuation of the actuating element in a vertical or z-direction may be detected in an easy and cheap manner.

SUMMARY

According to an embodiment, a manual control device for a control and operating unit of a lifting work platform, work machine or construction machine may have: at least one actuating unit which has an actuation element having at least one magnetic position element; and an evaluating unit which has at least one magnetic field sensor unit, wherein the evaluating unit is configured to detect a position and/or movement of the actuation element in a plane of movement based on a sensor signal from the magnetic field sensor unit, and wherein the actuation element is movable relative to the sensor unit along a further direction of movement perpendicularly to the plane of movement, characterized in that the evaluating unit is configured to detect a movement of the actuation element along the further direction of movement based on a sensor signal from the magnetic field sensor unit.

Another embodiment may have a control and operating unit having a manual control device as mentioned above.

Another embodiment may have a lifting work platform, work machine or construction machine having a control and operating unit as mentioned above.

The present invention provides a manual control device for a control and operating unit of a work machine or construction machine, comprising:

at least one actuating unit which comprises an actuating element comprising at least one magnetic position element; and an evaluating unit which comprises at least one magnetic field sensor unit, wherein the evaluating unit is configured to detect a position and/or a movement of the actuating element in a plane of movement based on a sensor signal from the magnetic field sensor unit, wherein the actuating element is movable relative to the sensor unit along a further direction of movement perpendicularly to the plane of movement, and wherein the evaluating unit is configured to detect a movement of the actuating element along the further direction of movement based on a sensor signal from the magnetic field sensor unit.

The inventive approach is of advantage compared to the approaches from the known technology since it is not required to provide an additional sensor element for acquiring the additional movement of the actuating element, for example in the vertical direction or z-direction. The invention has recognized that a movement in the vertical direction or z-direction may be acquired by the sensor signals already existing, since a movement of the actuating element comprising the magnetic position element, in a z-direction, results in a change in the magnetic field, more precisely in a change in the intensity of the magnetic field acquired and, consequently, in a change in intensity of the signal output by the sensor. This change in intensity is made use of according to the invention in order to detect a position of the actuating element along the z-axis. This procedure is of additional advantage in that the control unit or evaluating unit necessitated for evaluation only has to evaluate the signals obtained from the magnetic field sensor anyway, that is no additional circuit expenditure is necessary with regard to evaluating signals from other sensors. The actual evaluation is additionally of advantage in that it is easy to implement, since only the intensity of the signals present anyway is examined, which is possible at little expenditure as regards circuit technology, such that the signals indicating a deflection of the actuating element in the z-direction may be generated easily at the same time from the signals present anyway. In addition, all of the elements for acquiring the position are arranged within the evaluating unit and consequently protected from environmental influences.

In accordance with embodiments, the present invention provides a manual control device in which the actuating element is switchable between a first position wherein movement along the further direction of movement is allowed, and a second position wherein the movement along the further direction of movement is not possible, and in which the evaluating unit is configured to detect the first position or the second position of the actuating element based on a sensor signal from the magnetic field sensor unit.

In accordance with these embodiments, it may be provided for the distances between the non-deflected magnetic position element of the actuating element and the magnetic field sensor unit to be different in the first position of the actuating element and in the second position of the actuating element.

In accordance with an embodiment, it is provided for the manual control device to comprise an adapter plate and a hold-up plate of which one is mounted in the manual control device, depending on whether the actuating element is located in the first position or in the second position, wherein, in the second position of the actuating element, the hold-up plate is mounted in the manual control device so as to prevent movement of the actuating element from the second position, and wherein, in the first position of the actuating element, the adapter plate is mounted in the manual control device such that the distance between the non-deflected magnetic position element of the actuating element and the magnetic field sensor unit is greater than the distance when the hold-up plate is mounted.

In accordance with another embodiment, it is provided for the manual control device to comprise a mechanical lock integrated in the actuating element, configured to lock the actuating element in the second position and to release the actuating element in the first position such that the distances between the non-deflected magnetic positional element of the actuating element and the magnetic field sensor unit are different in the first position of the actuating element and in the second position of the actuating element.

The embodiments described above relating to the different positions of the actuating element for allowing/preventing movement in the further direction of movement (z-direction or vertical direction) are of advantage since the inventive manual control device may also be used in situations in which a movement in the z-direction is desired, but also in applications in which such a movement in the z-direction is not desired or not required. In both cases, only the manual control device has to be mounted. Further steps, in particular as regards the evaluating unit, are not required. Rather, the evaluating unit in accordance with the invention is configured to recognize the desired functionality of the manual control device mounted, that is to recognize whether same allows actuation in the z-direction or not. This takes place based on the signals acquired by the sensor unit, more precisely by examining the intensity of the signals acquired which may be recognized unambiguously due to the different distances between the magnetic position element and the sensor with different positions. Thus, no modification of the evaluating unit using which the actuating element is operated is necessary, since the evaluating unit, due to the signals acquired by the magnetic field sensor unit, recognizes automatically whether the actuating unit of the manual control device mounted at present allows a movement in the z-direction or not.

In accordance with further embodiments, the present invention provides a manual control device the evaluating unit of which is configured to cause calibration of the manual control device, wherein the evaluating unit is configured to only perform calibration when the actuation element is within a predetermined region around the zero point.

This type of calibration is of advantage since undesired or erroneous calibrations are avoided. In reality, situations may arise in which the manual control device is deflected undesirably. When calibration is performed automatically when switching on the construction machine or providing the manual control device with power, this undesired deflection of the actuation element of the manual control device results in an erroneous calibration, which in turn does not allow proper operation. It would be necessitated to perform an additional calibration or recalibration after bringing the actuation element back to the zero state. Such a situation may, for example, arise when the control and operating unit of the work machine or construction machine has been covered during non-operation such that, for example, the cover acts on the manual control device and undesirably deflects same from the zero point.

In accordance with the invention, this problem is avoided by the evaluating unit, when performing calibration, for example when restarting or starting the work machine or at another desired point in time, at first examining the position of the actuation element and establishing whether the actuation element is within a predetermined region around a zero point. The zero point is, for example, defined by known output signal values of the magnetic field sensor unit. Inventively, it may be provided for deviations from this zero point position of, for example, up to 5 to 10% to be tolerated such that, when switching on the apparatus, sensor values indicating that the position of the actuation element is within this region result in the calibration to be performed. When the signals acquired are outside this region, an undesirably strong deflection of the actuation element is assumed and calibration is suppressed. According to the invention, it may be provided for to inform the user on this circumstance in such a situation and to request same to check whether the actuation element is in the zero point. Only when this is established will calibration be performed, and only after having terminated calibration successfully will the manual control device be allowed to be used, that is with an excessive deflection of the actuation element of the manual control device, not only is calibration avoided, but also usage suppressed such that the work machine can only be put into operation after having successfully performed calibration.

Another advantage of this implementation is that deviations when mounting the actuating unit may also be tolerated. As has already been mentioned above in connection with known manual control devices, the actuating unit may be replaced independently of the sensor unit. Actually, the actuating unit is exposed to environmental conditions, whereas the sensor unit and the evaluation elements contained therein may be arranged in a casing so as to be protected from the environment such that the actuating unit is exposed to a stronger stress and a stronger wear and consequently has to be replaced more frequently. When replacing the actuating unit of the manual control device, the newly to mount actuating unit may be oriented obliquely compared to the actuating unit installed before, for example due to dirt, such that the zero point positions of the old and the new actuating unit no longer match. In such a case, calibration is nevertheless allowed, provided the deviation due to the variation when mounting is within the predetermined region around the actual zero point.

In accordance with another embodiment, the present invention provides a manual control device in which the evaluating unit is configured to indicate, after mounting the actuating unit, a maximum deflection of the actuation element when reaching a deflection of the actuation element which is below a maximum deflection by a certain value. In accordance with this embodiment, it may be provided for the evaluating unit to be configured to adjust the predetermined value, during operation of the manual control device, to the maximum deflection of the actuation element. The predetermined value may, in accordance with embodiments, be 80% to 90% of the maximum deflection of the actuation element.

In accordance with embodiments, it may be provided for the predetermined region mentioned above of, for example, 80% where a maximum deflection is indicated, to be reduced after being mounted and during further operation of the manual control device to an extent such that a maximum deflection is established and set gradually.

This embodiment is of advantage since an unsymmetrical deflection of the actuation element of the actuating unit of the manual control device may be compensated by this. Such an unsymmetrical orientation may, for example, arise when, when mounting the actuating unit, the actuating unit is installed to be somewhat tilted or oblique relative to the original mounting position, due to dirt or the like. In such a situation, the deflections in the corresponding directions (for example in the x-direction and the y-direction) are different. Exemplarily, the deflection in the positive direction may be stronger than in the negative direction. This would result in a situation in which the maximum deflection, for example in the positive direction, is indicated by the evaluating unit only at a later point in time than in the case of a deflection in the opposite direction. In order to compensate this, according to the invention, the region of 80% to 90% is set after mounting, and as soon as a sensor signal within this region is recognized, a 100% deflection is assumed such that, even with different maximum deflections in different directions, a maximum deflection will be indicated by the control unit with equal deflection. A similar situation may arise when the actuation element of the manual control device exhibits an asymmetrical setup.

In accordance with further embodiments, the present invention provides a manual control device in which the actuating unit comprises a manually unlatchable locking device which, in the non-actuated state, prevents the actuation element from being moved.

In accordance with embodiments, the manual control device includes a guide which cooperates with the manually unlatchable locking device and which, in the actuated state of the manually unlatchable locking device, is movable relative to the actuating element, wherein the manually unlatchable locking device comprises:

a rod comprising a tapering lower end arranged in the region of the guide, wherein the rod is arranged to be movable in a guide pipe of the actuation element received in the guide, and one or several balls arranged between the inner wall of the guide and the rod, wherein the inner wall of the guide comprises one or several recesses for partly receiving the balls, and wherein the guide type comprises one or several holes for partly receiving the balls.

Advantageously, the manually unlatchable locking device is effective so that, in its non-actuated state, the non-tapering part of the rod is arranged in the region of the holes such that one ball is partly arranged in a hole and partly extends in a recess in the guide such that a movement of the guide and, thus, of the actuating element, is impossible. In the actuated state of the manually unlatchable locking device, the tapering part of the rod is arranged in the region of the holes so that a ball is arranged partly in a hole and extends into the guide pipe such that movement of the guide and, thus, the actuating element is possible.

The locking device in accordance with the embodiments mentioned above is of advantage since undesired actuation or deflection of the actuating element of the actuating unit may be avoided, for example by an unintended contact while performing work operations on a lifting work platform which is equipped with the inventive manual control device. The inventive implementation of the manually unlatchable locking device is of advantage since no external elements are provided, rather mechanics arranged within the structure is provided which can be actuated by easy handling using one hand only such that the locking is released easily. Advantageously, it is provided for locking to the locked position to be biased such that, when releasing the locking device and when the actuation element returns to the zero state, automatic latching is performed. This implementation is of advantage since it is ensured by this that, with non-actuation of the actuation element, same will automatically be returned to the zero state and be latched there such that, when the user releases the actuation element, same will return to a defined state starting from which a further actuation of the work machine or construction machine may be performed, after being unlatched again.

In accordance with embodiments, the present invention provides a manual control device comprising a bellows, wherein the bellows exhibits a basically cylindrical shape.

This embodiment is of advantage compared to conventional embodiments of a bellows, since easy replacement of the bellows is made possible. Conventional approaches use a bellows that is basically frustoconical and becomes narrower from a lower end in the direction of an upper end of the actuation element. The result of this is that the actuation element has to be removed for replacement so that the bellows may be pulled off same downwards. As has already been mentioned above, the actuation element is exposed to the environmental conditions and thus subject to increased wear. The actuation element comprises the bellows mentioned above which, during movement of the actuation element of the actuating unit, is moved correspondingly such that this element is subject to an even stronger stress than the other elements of the actuating unit and consequently has to be replaced more frequently than the entire actuating unit. In addition, the material of the bellows is usually an elastic material which, due to the environmental conditions, such as, for example, rain, sun, changes of temperatures, is subject to increased wear which may result in the material to become rough and thus brittle, again necessitating replacement. As has been mentioned, conventional approaches necessitate the actuation element or the entire actuating unit to be disassembled so as to pull off the bellows. In accordance with the invention, this is avoided by implementing the bellows to be essentially cylindrical, more precisely of a cylindrical shape such that the upper diameter of the bellows and the lower diameter of the bellows are larger than the diameter of the element of the actuating unit projecting beyond the bellows. Thus, in the case of replacement, only the corresponding fixing of the bellows at the elements of the actuating unit is released and the bellows may then be simply pulled off upwards, without any other parts of the actuating unit having to be demounted. The new bellows is then similarly pulled over the elements of the actuating unit from above and fixed such that replacement, compared to conventional approaches, is considerably easier and less complicated.

In accordance with further embodiments, the present invention provides a manual control device in which the actuating unit comprises attaching devices by means of which the actuating unit may be attached detachably to the control and operating unit, wherein the attaching devices are arranged at the actuating unit such that mounting the actuating unit to the control and operating unit is possible only in a predetermined direction or position. The attaching devices may, in accordance with embodiments, comprise screws or click-in devices.

This embodiment is of advantage since, when mounting an actuation device, for example due to a necessitated replacement caused by wear, it is ensured that the actuating unit may take only a single orientation, thereby ensuring correct acquisition of the position of the magnetic positional element in the actuating element when first mounting same.

In accordance with further embodiments, the present invention provides a manual control device in which the evaluating unit is watertight and/or airtight, wherein the at least one magnetic positional element is a permanent magnet, wherein the magnetic field sensor unit comprises at least one sensor element, wherein the at least one sensor element may comprise a Hall effect sensor, a magnetoresistive sensor or an xMR sensor.

Additionally, the present invention provides a control and operating unit comprising the inventive manual control device, and a work machine or construction machine including the inventive control and operating unit.

The above expositions related to a manual control device in which the z-position of an actuating element is acquired by a magnetic field sensor unit, wherein, in accordance with embodiments, additionally the lock mentioned and/or the bellows mentioned above may be used. It is pointed out in this regard that the lock and/or the bellows may be realized independently of the implementation of acquiring a movement of the actuating element in the z-direction such that the present invention, in accordance with further embodiments, provides a manual control device for a control and operating unit of a work machine or construction machine, comprising:

at least one actuating unit which comprises an actuating element comprising at least one position element; and an evaluating unit which comprises at least one sensor unit, wherein the evaluating unit is configured to detect a position and/or a movement of the actuation element in a plane of movement based on a sensor signal from the sensor unit;

a manually unlatchable locking device which, in the non-actuated state, prevents the actuating element from being moved; and a guide which cooperates with the manually unlatchable locking device and which, in the actuated state of the manually unlatchable locking device, is movable relative to the actuating element, wherein the manually unlatchable locking device comprises:

a rod comprising a tapering lower end which is arranged in the region of the guide, wherein the rod is arranged to be movable in a guide pipe of the actuating element, received in the guide, and one or several balls arranged between an inner wall of the guide and the rod, wherein the inner wall of the guide comprises one or several recesses for partly receiving the balls, and wherein the guide pipe comprises one or several holes for partly receiving the balls.

The implementation of a manual control device in the way described above exhibits the advantages described already above in connection with the locking device, so that reference here is made to the above expositions.

Additionally, the present invention provides a manual control device for a control and operating unit of a work machine or construction machine, comprising:

at least one actuating means which comprises an actuating element comprising at least one position element;

an evaluating unit which comprises at least one sensor unit, wherein the evaluating unit is configured to detect a position and/or a movement of the actuating element in a plane of movement based on a sensor signal from the magnetic field sensor unit; and a bellows which comprises an essentially cylindrical shape.

With regard to the advantages of the implementation of the bellows in the type described above, reference is made to the corresponding above expositions.

BRIEF DESCRIPTION OF THE DRAWINGS

Embodiments of the present invention will be detailed below referring to the appended drawings, in which.

DETAILED DESCRIPTION OF THE INVENTION

Figure 1:
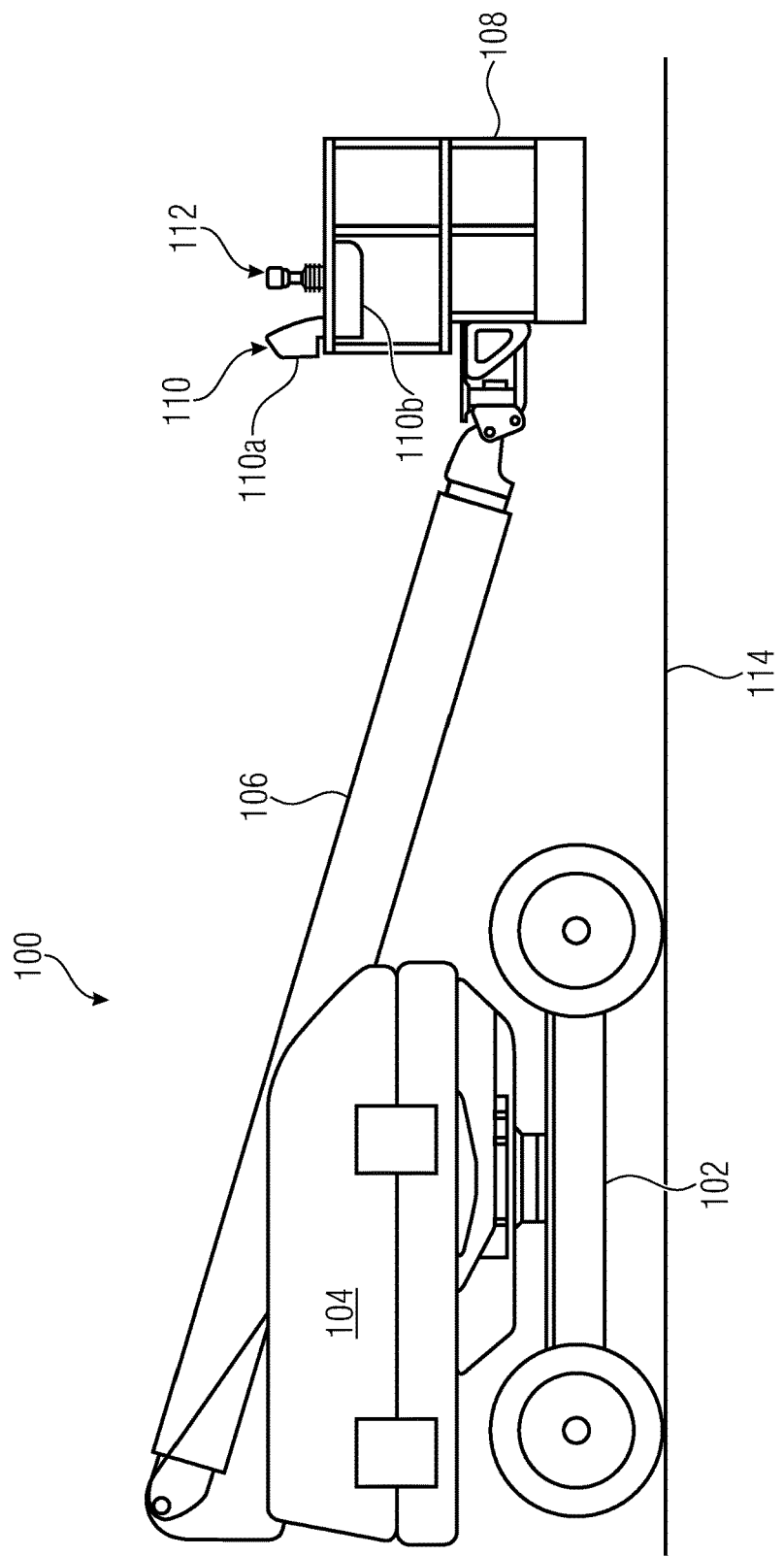
FIG. 1 is an illustration of a lifting work platform comprising a control and operating unit which comprises the inventive manual control device.

Embodiments of the present invention will be detailed below referring to the appended drawings, wherein same elements or elements of same effect are provided with same reference numerals in the appended drawings.

FIG. 1 shows the illustration of a work machine or construction machine which comprises a control and operating unit comprising the inventive manual control device. FIG. 1 shows a lifting work platform 100 including a movable chassis 102 and as assembly 104 rotatably arranged on the chassis 102 which, apart from the necessitated motors for moving the lifting work platform 100, comprises a crane mechanism 106 at the front end of which an operating platform, such as, for example, a work cage, is arranged. The work cage 108 comprises a control and operating unit 110 which in turn comprises a first casing part 110a which is basically oriented vertically, and a second casing part 110b. The control unit 110 additionally comprises a manual control device 112 which will be discussed in detail below. Using the manual control device 112, the lifting work platform 110 may be controlled such that the work cage 108 is lifted or lowered relative to the ground 114 in dependence on a direction of movement of the manual control device 112. Rotation of the lifting work platform 100 is also caused by a corresponding actuation of the manual control device 112.

Figure 2:
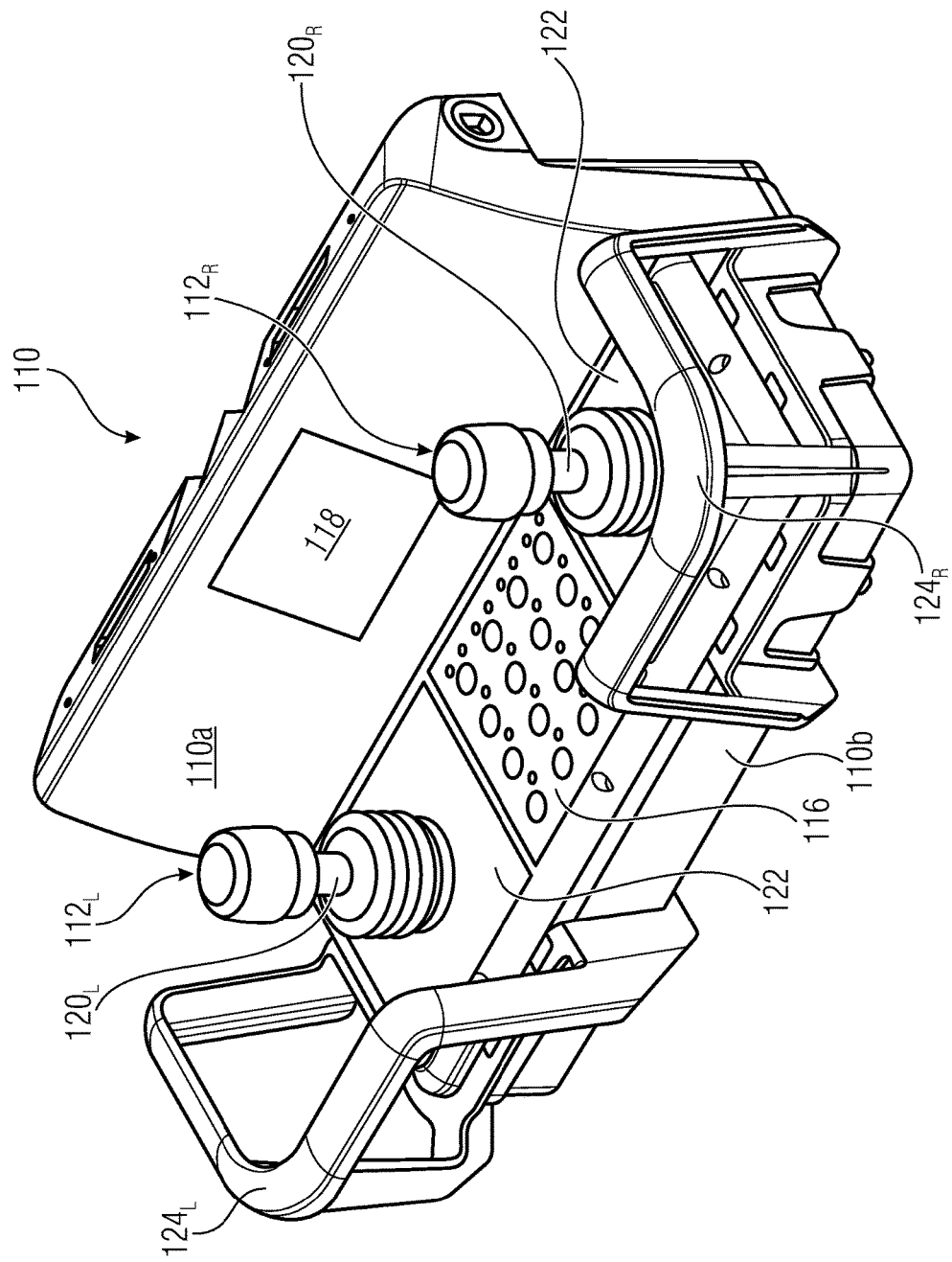
FIG. 2 is a detailed illustration of the control and operating unit illustrated in FIG. 1.

FIG. 2 shows an illustration of the control and operating unit 110 mentioned referring to FIG. 1. Various modules are arranged in the casing parts 110a and 110b, using which a machine operator may control or drive tools and/or processes in the machine. Among these modules are, for example, one or several keypads 116 which are equipped, for example, with additional LEDs (light emitting diodes), one or several display elements 118 and, in the example of the control and operating unit 110 shown in FIG. 2, two manual control devices, that is a left manual control device $112_L$ and a right manual control device $112_R$. The two manual control devices may be of identical or different setup. With regard to the manual control devices 112 in FIG. 2, it is pointed out that only the actuating units $120_L$ and $120_R$ thereof are illustrated which are mounted on a first plate 122 of the control and operating unit 110. Details of the manual control devices 112 will be discussed below referring to further figures. In addition, the control and operating unit 110 comprises the left and right handrails $124_L$ and $124_R$ illustrated in FIG. 2, which may be provided in order to additionally protect the actuating units $120_L$ and $120_R$ from undesired deflection.

Details of the manual control devices illustrated in FIGS. 1 and 2 will be discussed below in greater detail.

Figure 3:
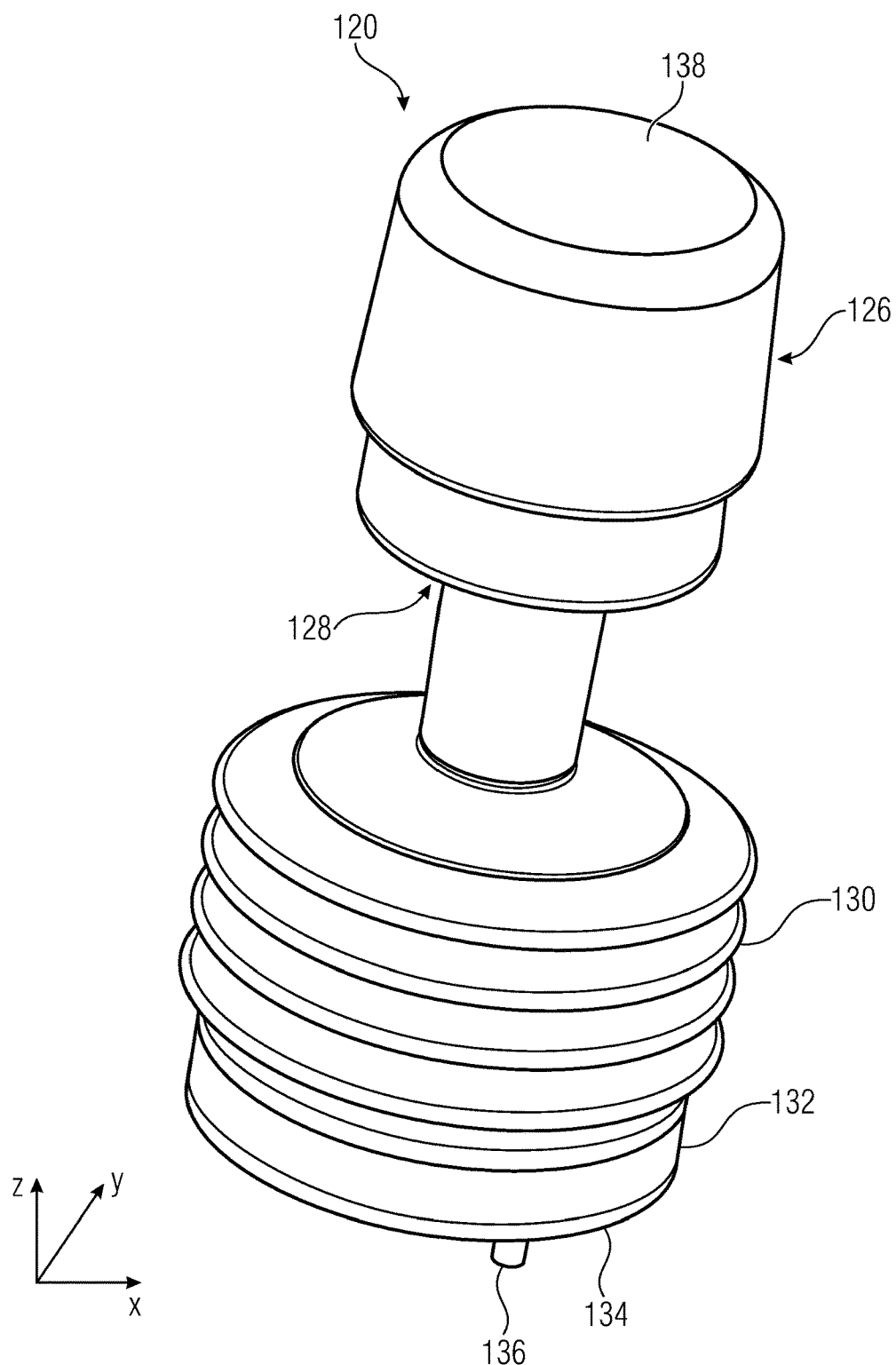
FIG. 3 is an asymmetrical illustration of the actuating unit of a manual control device from FIG. 1 and FIG. 2.

FIG. 3 shows an asymmetrical illustration of the actuating unit 120 of a manual control device 112, as has been discussed briefly referring to FIGS. 1 and 2. The actuating unit 120 comprises an actuation element 126, a manually unlatchable locking device 128, a bellows 130 for protecting the interior mechanics, not illustrated in FIG. 3, from environmental influences, such as, for example, rain, dust, dirt, etc., a baseplate 132, an optionally attachable adapter plate 134, and one or several attaching devices 136. The actuation element 126 comprises, on its upper side, a knob 138 by means of which an operator may move the actuation element 126 in a plane of movement, for example along the x- and y-axes of the coordinate system shown in FIG. 3. In accordance with the invention, it may be provided for the actuation element 136 to also be movable along a further direction of movement perpendicularly to the plane of movement (x/y-plane), that is, in the example shown in FIG. 3, in the vertical direction or along the z-axis.

Figure 4A:
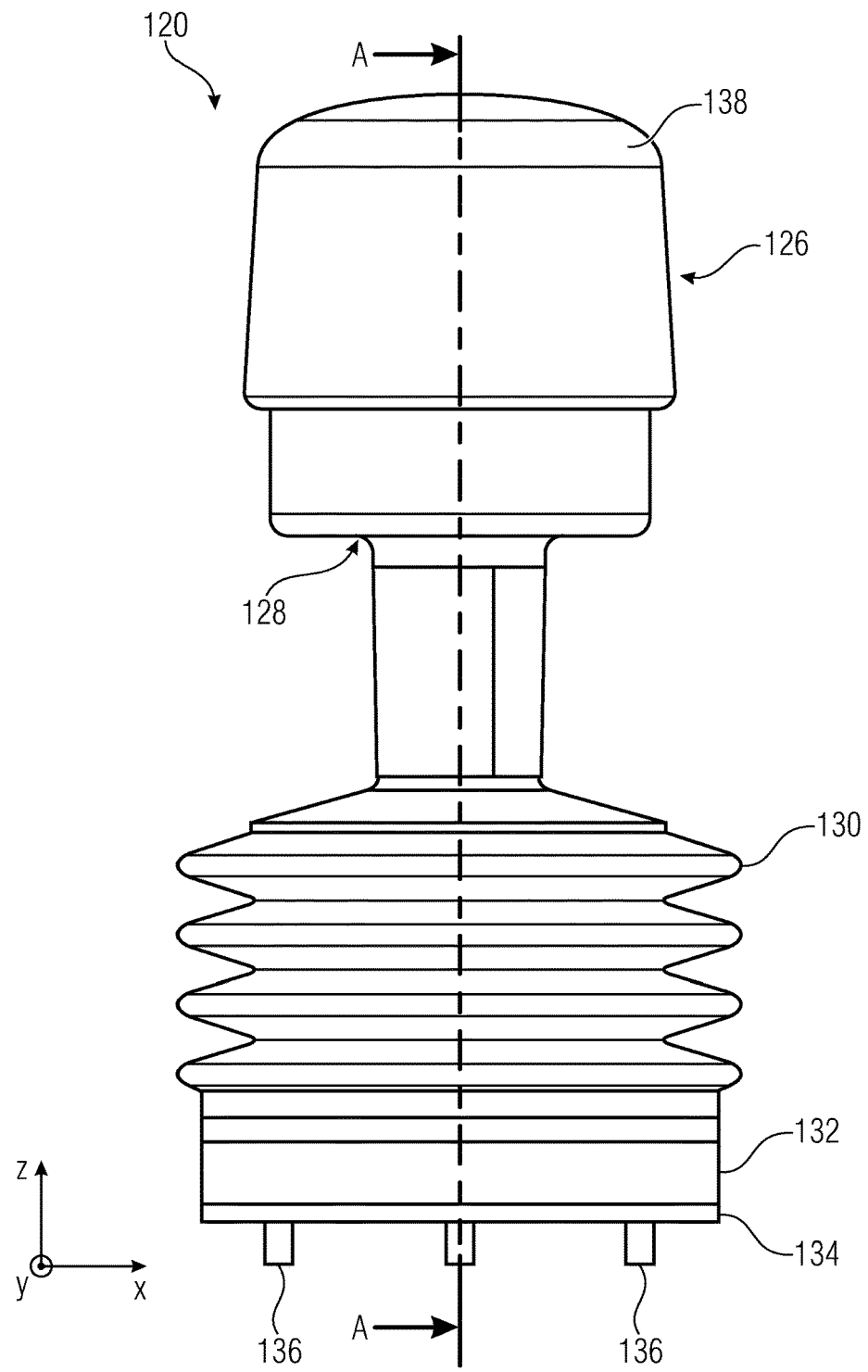
FIGS. 4a, 4b, and 4c show the actuating unit of FIG. 3 in different illustrations, FIG. 4a showing a lateral illustration of the actuating unit, FIG. 4b showing a sectional view of the actuating unit along the line A-A in FIG. 4a, and FIG. 4c showing a top view of the actuating unit from below.
Figure 4B:
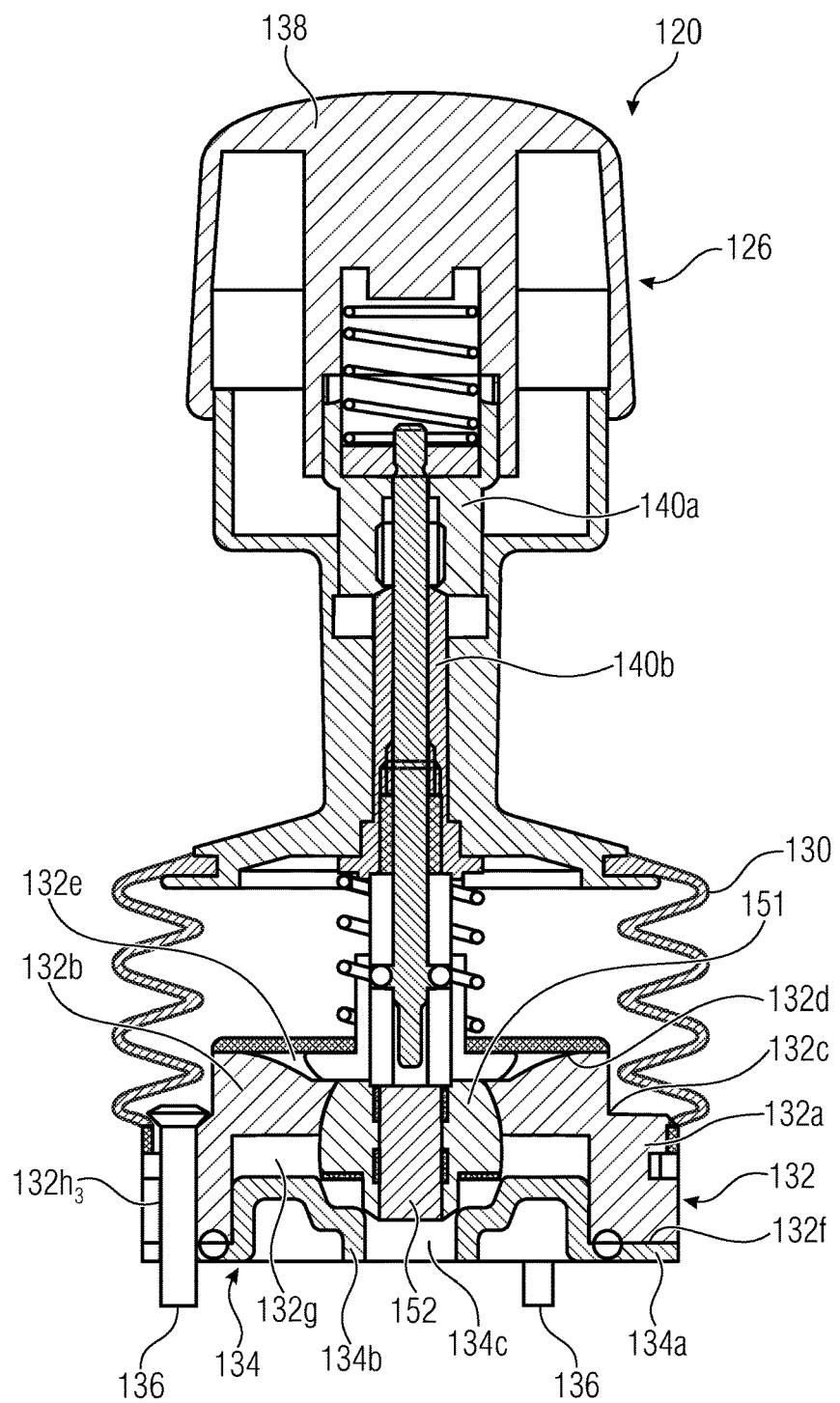
Figure 4C:
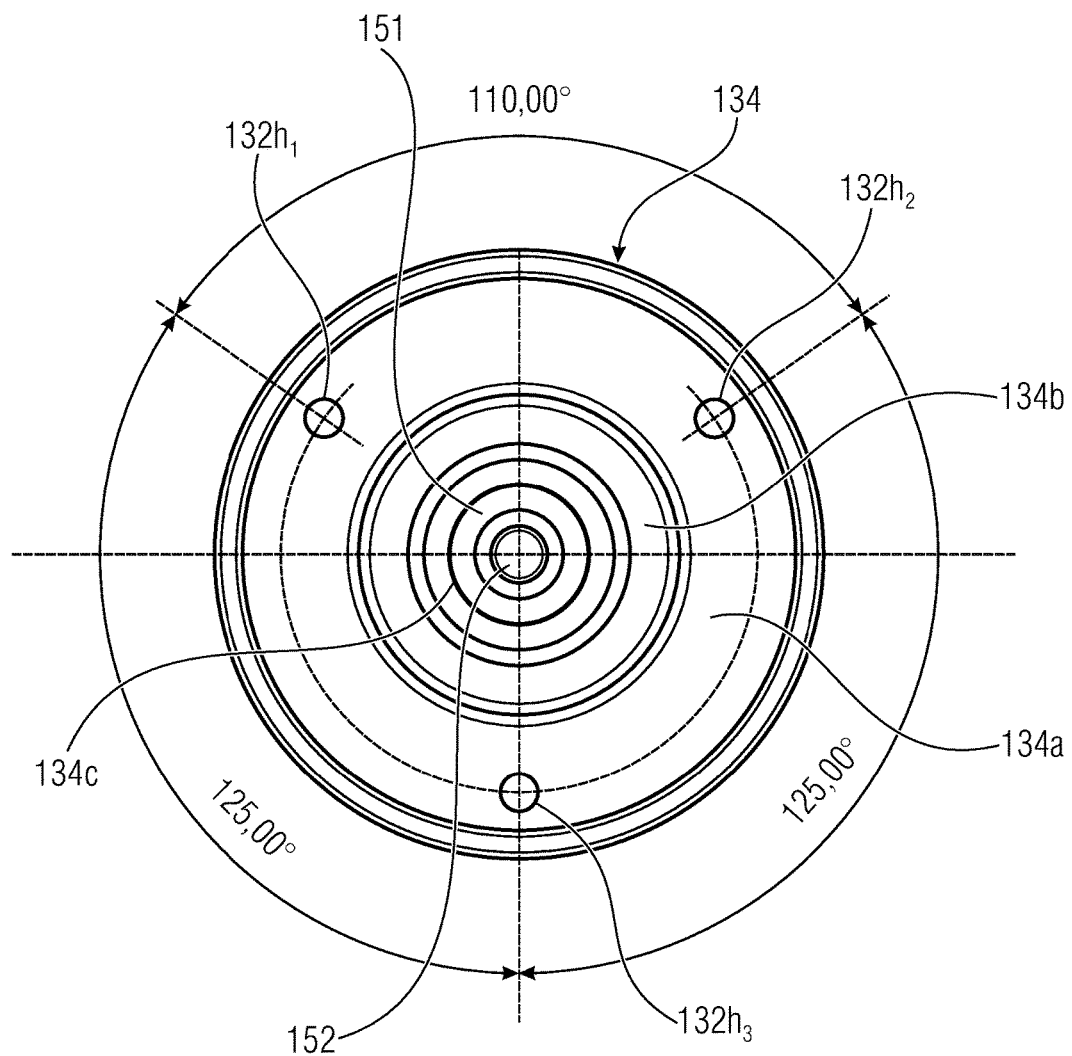

FIG. 4 shows the actuating unit 120 of FIG. 3 in different illustrations. FIG. 4a is a lateral illustration of the actuating unit 120, FIG. 4b is a sectional view of the actuating unit 120 along the line A-A in FIG. 4a, and FIG. 4c is a top view of the actuating unit from below, that is looking at the adapter plate 134.

The illustration of the actuating unit 120 shown in FIG. 4a basically shows the same elements as may also be seen in FIG. 3 and having already been described there. Additionally, it may be seen in FIG. 4a that the actuating unit 120 comprises several attaching devices 136, for example implemented as screws, which allow detachably attaching the actuating unit 120 to the control and operating unit 110, for example to the front plate 122 mentioned above (see FIG. 2).

The sectional view shown in FIG. 4b shows the internal mechanics of the actuating unit 120. The actuating unit 120 includes the baseplate 132 shown already referring to FIGS. 3 and 4a, which, as may be seen in FIG. 3, is basically cylindrical. The baseplate 132 comprises an outer portion 132a and an inner portion 132b, wherein the inner portion 132b comprises a larger thickness than the outer portion 132a so that the baseplate 132 exhibits a step in a region 132c. An upper side 132d of the inner portion 132b of the baseplate 132 comprises a depression or recess 132e which extends, starting from an edge region of the inner portion 132b, towards the lower side 132f of the baseplate 132. A central region of the depression 132e is planar and the depression extends, starting from this planar region, in a rectilinear manner towards the upper side 132d of the baseplate 132. The depression 132e serves for receiving a guide for the actuation element 126, which will be described below in greater detail.

The baseplate 132 additionally includes a recess 132g which extends from the lower side 132f towards the upper side 132d of the baseplate. In the embodiment shown in FIG. 4, the adapter plate 134 is mounted in the recess 132g. The adapter plate 134 comprises an outer portion 134a arranged on the lower side 132f of the baseplate 132 in the outer portion 132a thereof. The adapter plate 134 includes a central portion 134b extending towards the inside of the recess 132g and comprising a structure causing the actuation element 126 to be guided in a movement in the z-direction.

The actuation element 126 comprises a guide sleeve 140a and a guide pipe 140b arranged at the guide sleeve 140a. The guide sleeve 140a is connected to the knob 138. A holder 151 which in the embodiment shown comprises the shape of a ball cut off on the upper side and lower side is arranged at the lower end of the guide pipe 140b. An upper side of the holder 151, facing the upper side 132d of the baseplate 132, is planar and a lower side of the holder 151, facing the lower side 132f of the baseplate 132, comprises a projection in a central portion such that the lower side of the holder 151 comprises a circumferential edge. A recess in which a position element 152, for example a magnetic position element in the form of a permanent magnet is arranged, is formed in the lower side of the holder 151. Actuation of the actuation element 126 causes a corresponding movement of the holder 151 and of the position element 152 arranged therein.

Detachable attachment of the actuating unit 120 to the control and operating unit (see FIGS. 1 and 2) is achieved by the attaching devices 136 which engage into the baseplate or front plate 122 mentioned above through corresponding bores $132h_1$ to $132h_3$. In other words, the actuating unit 120 is held basically by the baseplate 132, at the front plate 122 (see FIG. 2) of the control and operating unit 110. The adapter plate 134 shown in FIG. 4 which will be discussed below in greater detail is, in accordance with embodiments, not screwed to the baseplate 132, but attached to the front plate 122 together with same. Here, the adapter plate 134 in the outer region 134a has the same hole structure as in the outer region 132a of the baseplate 132. In other embodiments, the actuating unit 120 may be attached to the control and operating unit 110 by other means, for example by a click-in device or the like.

FIG. 4c shows the actuating unit 120 from below, that is when looking at the adapter plate 134. In the center, the adapter plate 134 comprises an opening 134c through which the position element 152 and part of the holder 151 are visible. In the outer region 134a, the adapter plate 134 and the baseplate 132 behind it, which is not visible in this view, comprise the openings or holes $132h_1$ to $132h_3$ for the attaching devices 136. In accordance with embodiments, the holes $132h_1$ to $132h_3$ are not arranged evenly, but in different angles. Exemplarily, the holes $132h_1$ and $132h_2$ are arranged at an angle of 110° to each other, whereas the holes $132h_1$ and $132h_3$ and the holes $132h_2$ and $132h_3$ are each arranged at an angle of 125° to each other. This implementation ensures that mounting the actuating unit 120 to the control and operating unit 110 is possible only in a predetermined direction or at a predetermined position. Such a procedure may be desired in accordance with embodiments so as to cause mounting of the actuating unit 120 to the control and operating unit 110 in correspondence with a predetermined orientation or at a predetermined position, for example when the manual control device 112 is implemented to allow a preferential movement of the actuation element 126 in the x- and y-directions. Such a preferential movement may, for example, be achieved by a correspondingly structured depression 132e in the upper side 132d of the baseplate 134. It may, for example, be provided for the depression in the upper side 132d of the baseplate 132 to be formed by a first depression extending in the x-direction and by a second depression extending in the y-direction, perpendicularly to the first depression, and for movement of the actuation element 126 to be guided by a guide arranged in the depressions, which will be discussed below in greater detail.

Figure 5A:
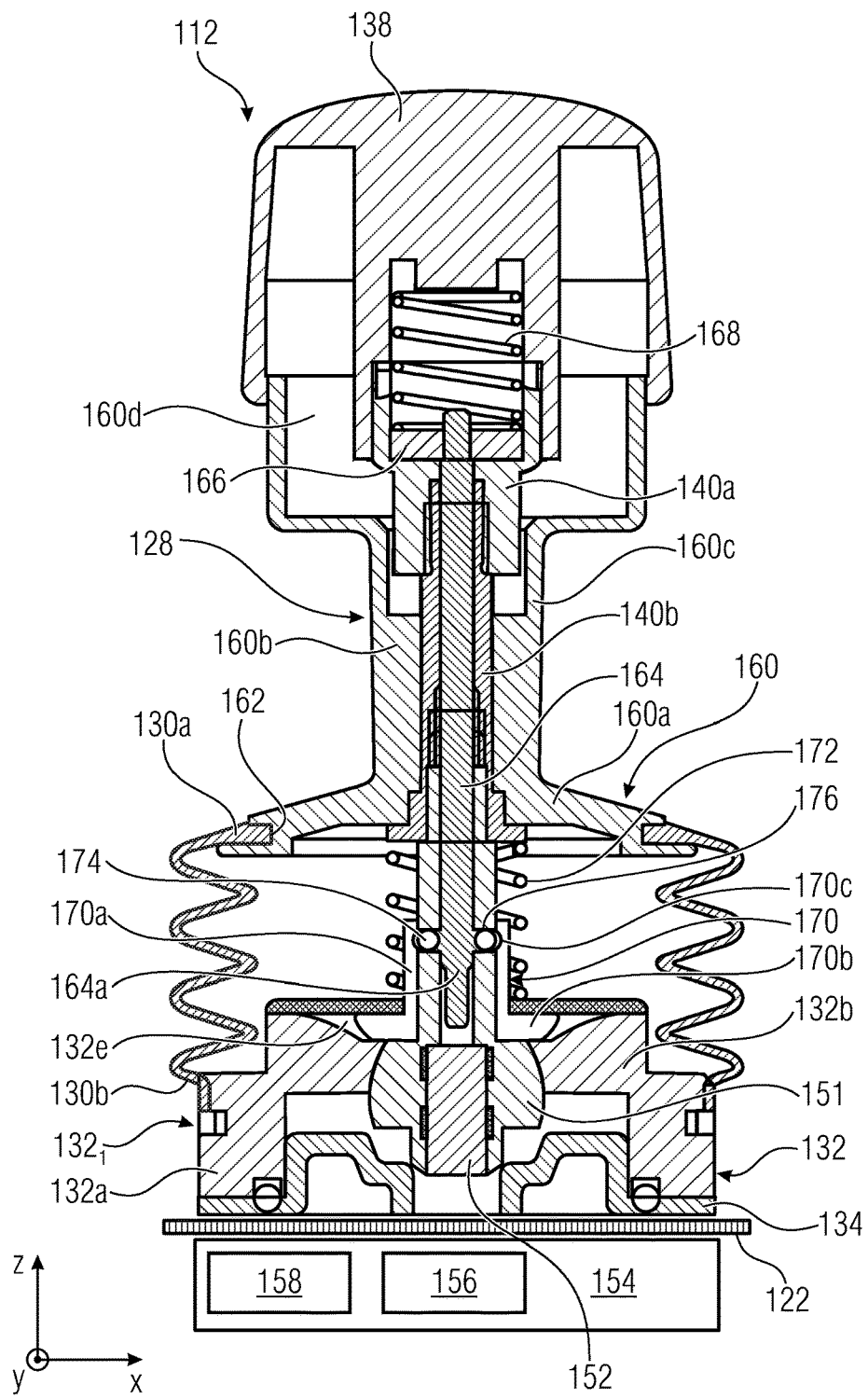
FIGS. 5a, 5b, and 5c show the inventive manual control device in accordance with an embodiment, FIG. 5a showing a further sectional view of the actuating unit with a latched locking device, FIG. 5b showing an illustration of the actuating unit with an unlatched locking element and pressed actuation element, and FIG. 5c showing an illustration of the actuating unit with a deflected actuation element.
Figure 5B:
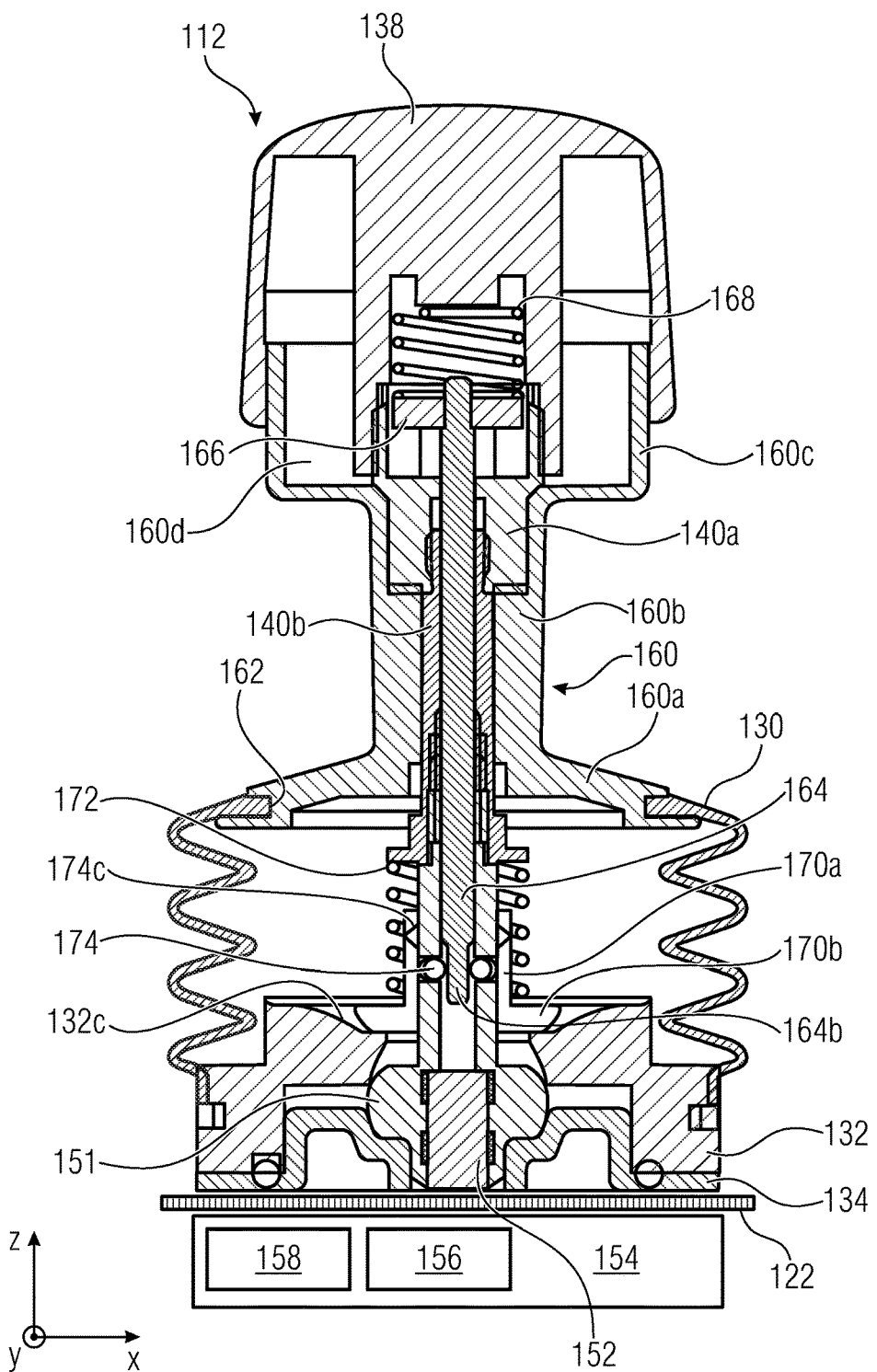

FIG. 5 shows the inventive manual control device in accordance with an embodiment. FIG. 5a shows another sectional view of the manual control device shown in FIG. 4a, which is mounted on the front plate 122. Additionally, FIG. 5a shows the actuating unit 120 with a latched locking device 128. FIG. 5b shows an illustration of the actuating unit 120 with an unlatched locking element 128 and a pressed actuation element 126.

In FIG. 5a, the front plate 122 (see also FIG. 2) is illustrated onto which the actuating unit 120, also referred to as joystick, is attached. Below the front plate 122, there is an evaluating unit 154 which comprises a sensor unit 156, for example a magnetic field sensor unit in the form of a Hall sensor, magnetoresistive sensor or xMR sensor. Additionally, the evaluating unit 154 in accordance with embodiments may comprise a controller 158, for example a microcontroller, connected effectively to the sensor unit 156 in order to provide, based on the signals acquired by the sensor unit, an output signal which indicates a deflection of the actuating unit 120. The magnetic field sensor unit 156 may comprise a plurality of magnetic field sensor elements in order to detect a position and/or a movement of the actuation element 126. A movement of the actuation element 126 causes a movement of the position element 152, the movement of which is acquired by the sensor unit and evaluated using the controller 158. The sensor unit 156 comprises, for example, a Hall effect sensor of the type "Melexis" MLX90363 of Melexis N.V., Rozendaalstraat 12, 8900 Ypern, Belgium. With such a device, two Hall effect sensor elements are integrated in a casing. Using the controller 158, an electrical signal or measuring value for the degree of deflection of the actuation element 126 and an electrical signal or measuring value for a direction of the deflection are generated from the electrical signals or measuring values of the two sensor elements.

In accordance with embodiments, the inventive manual control device 112 is implemented such that, apart from the movement of the actuation element 126 in the x/y-plane of movement, additionally a movement in the z-direction, perpendicularly thereto, is also possible. Such a change in the z-position is, in accordance with the invention, also acquired by the sensor unit 156, for example based on a change in the intensity of the output signals forming by the change in the magnetic field strength due to the changing distance between the position element 152 and the magnetic field sensors of the sensor unit 156. Consequently, it is not necessary in accordance with the invention to provide additional sensor elements in a manual control device which allows a movement in the z-direction, rather such a vertical movement may be acquired easily by the magnetic field sensors existing already.

In accordance with further embodiments, the inventive manual control device 112 is implemented such that the evaluating unit 154 will only perform calibration of the manual control device 112 when the actuation element is within a predetermined region around the zero point. This avoids undesired or erroneous calibration when the manual control device 112 is deflected undesirably before switching on/activating the work machine or control unit. In such a case, in conventional approaches, when switching on the construction machine or when providing the manual control device with power, calibration would be performed automatically. A resulting, erroneous calibration, however, does not allow proper operation such that renewed calibration would be necessitated as soon as the actuation element has been brought to the zero state. Such a situation may, for example, arise when the control and operating unit of the work machine or construction machine has been covered during non-operation thereof such that the cover acts on the manual control device, for example, and undesirably deflects same from the zero point.

The present invention, in accordance with embodiments, avoids these problems since the evaluating unit 154 is configured or programmed to check, for example when first starting or starting the work machine, the position of the actuation element at first in order to find out whether the actuation element is within a predetermined region around a zero point. The zero point is, for example, defined by known output signal values of the magnetic field sensor unit. In accordance with the invention, it may be provided for deviations from this zero point position of up to 5 to 10% to be tolerated such that sensor values, when switching on the apparatus, indicating that the position of the actuation element is within this region, result in calibration to be performed. If the signals acquired are outside this region, an undesirably strong deflection of the actuation element is assumed and calibration suppressed. In accordance with further embodiments, it may be provided for to inform the user about this condition and request same to check whether the actuation element is in the zero point. Only when this is established will calibration be performed, and only after having completed a successful calibration will usage of the manual control device be allowed, that is in the case of an excess deflection of the actuation element of the manual control device, not only will calibration be avoided, but also usage suppressed such that the work machine may only be put into operation after successful calibration.

This embodiment is of further advantage in that deviations when mounting the actuating unit may be tolerated. When replacing the actuating unit of the manual control device, the newly to mount actuating unit may, for example, be oriented obliquely relative to the previously installed actuating unit, for example due to dirt, such that the zero point positions of the old and new actuating units no longer match. In such a case, calibration will nevertheless be allowed, if the deviation due to the mounting deviation is within the fixed region around the actual zero point.

In accordance with another embodiment, the inventive manual control device 112 is implemented such that the evaluating unit 154, after having mounted the actuating unit, indicates already a maximum "electronic" deflection when reaching a deflection of the actuation element which is, for example, only 80% to 90% of the maximally allowed mechanical deflection of the actuation element. This region may be reduced during further operation, until the "electronic" deflection corresponds to a 100% mechanical deflection of the actuation element. This embodiment compensates a potentially unsymmetrical deflection of the actuation element, for example due to tilted or oblique mounting. In such a case, the deflections in the corresponding directions (for example in the x-direction and in the y-direction) are different. A similar situation may arise when the actuation element of the manual control device exhibits an asymmetrical setup.

The setup and mode of functioning of the locking device 128 provided in accordance with an embodiment will be discussed in greater detail referring to FIG. 5a and FIG. 5b. The locking device 128 includes a locking element 160 which comprises a lower, flat frustoconical portion 160a, a cylindrical center portion 160b extending from the top, flat portion of the frustoconical portion 160a upwards, and an upper cylinder-shape portion 160c. The locking element 160 comprises an internal bore in the lower and central portions which receives the guide pipe 140b of the actuation element 126. The upper portion 160c of the locking element 160 and an abutting portion of the central portion 160b comprise a recess 160d into which a central portion of the knob 138 extends. An upper part of the guide pipe 140b extends through the recess 160d to the knob 138. The guide sleeve 140a of the actuation element 126 which extends to that part of the recess 160d of the locking element 160 which is formed in an upper part of the center portion 160b of the locking element 160 is arranged at the lower end of the center portion 138a of the knob 138.

The locking device 128 comprises an internal rod 164 which is arranged to be movable within the guide pipe 140b. A lower end of the rod 164 adjacent to the base plate 132 comprises a tapering end 164a, and an upper end adjacent to the knob 138 is provided with a plate 166 which, when being moved upwards in FIG. 5a, cooperates with a spring element 168 arranged in the knob 138 and causes compression thereof.

The locking device 128 comprises a guide 170 which is implemented as a sleeve surrounding the guide pipe 140a of the actuation element 126 and is movable relative to said guide pipe. The guide sleeve 170 comprises a sleeve portion 170a and a projection 170b extending radially outwards from a lower end of the sleeve portion 170a. The lower portion of the guide sleeve 170 comprising the projection 170b is arranged within the depression 132e described above, wherein the flat portion of the depression 132e comprises a dimension such that the lower portion of the guide sleeve 170 comprising the projection 170b, in a non-deflected position of an actuation element 126, rests on said planar portion. In accordance with the embodiment illustrated, the depth of the depression 132e is selected in correspondence with the height of the projection 170b of the guide sleeve 170, and the depression extends basically rectilinearly upwards from the flat plane towards the outer edges of the internal portion 132b of the baseplate 132. The guide sleeve 170 is biased by the spring element 172 to the positioned shown in FIG. 5a, wherein a lower end of the string element 172 surrounds the sleeve portion 170a and is arranged on the projection 170b of the guide sleeve 170. A top, opposite end of the spring element 172 is arranged at a lower side of the locking element 160.

The locking device comprises one or several balls 174 comprising a diameter which is greater than a thickness of the wall portion of the guide pipe 140b. The balls 174 are arranged in corresponding openings 176 in the wall of the guide pipe 170b, wherein the balls 174, due to the larger diameter, project from the openings or holes 176 either in the direction towards the guide sleeve 170 or towards the internal rod. In the latched position of the manual control device 112 shown in FIG. 5a, the balls 174 extend towards the guide sleeve 170 which in turn comprises depressions 170c in the sleeve portion 170a into which the balls 174 extend in the latched position. In a non-latched position, movement of the internal rod 164 in an upward direction is caused such that the situation shown in FIG. 5b arises according to which the balls are no longer locked, but may move towards the internal space of the guide pipe, due to the tapering portion 164a of the rod 164, and thus allow movement.

The mode of functioning of the locking mechanism just described will be discussed below referring to FIG. 5. In order to be able to move the actuation element 126 in the x-, y- and/or z-directions, it is necessitated to manually unlatch the locking device 128 at first by moving the locking element 160 towards the knob 138. When moving the actuation element 126, it is not permanently necessary to hold the locking element 160 in this unlatched position. However, when the actuation element 126 is moved back to the starting position or central position, the actuation element 126 is latched again automatically so as to prevent undesired operation or movement of the manual control device.

The balls 174 which, with a non-actuated locking device 128, engage through the holes or openings 176 in the guide pipe 140b into the recesses or depressions 170c, circumferentially located on the internal wall of the guide sleeve 170 and thus prevent movement of the guide sleeve 170 and, thus, of the entire actuation element 126 are arranged between the internal wall of the guide sleeve 170 and the internal rod 164. When unlatching or when moving the locking element 160 towards the knob 138, the internal rod 164 which is arranged to be movable within the guide pipe 140b, and the plate 166, fixedly arranged thereon, below the spring element 168 are also moved towards the knob 138 so that the spring element 168 is compressed. Since the internal rod 164 is tapering at its lower end, in the region of the guide 170, it is possible for the balls to move out of the recesses 170c, due to the movement of the internal rod 164 towards the knob 138, such that movement of the guide 170 and, thus, the entire actuation element 128 becomes possible.

When the locking element 160 is released again, it would again be pressed downward due to the spring force of the spring element 168. Here, the balls 174 are moved again into the recess 170c such that the movement of the guide 170 and, thus, the entire actuation element 126 is prevented, that is the actuation element 126 is latched again.

When the actuation element 126 is unlatched, it may be moved in the x-, y-, or z-direction, wherein when moving the actuation element 126, the knob 138 and mechanics arranged therein comprising, among other things, the guide sleeve 140a and the guide pipe 140b are moved downwards, thereby compressing the spring element 172. When the knob 138 is released again, it is moved upwards again due to the spring force of the spring element 172.

FIG. 5b shows the element described in FIG. 5a with an unlatched locking device 128 and a deflection in the z-direction.

Figure 5C:
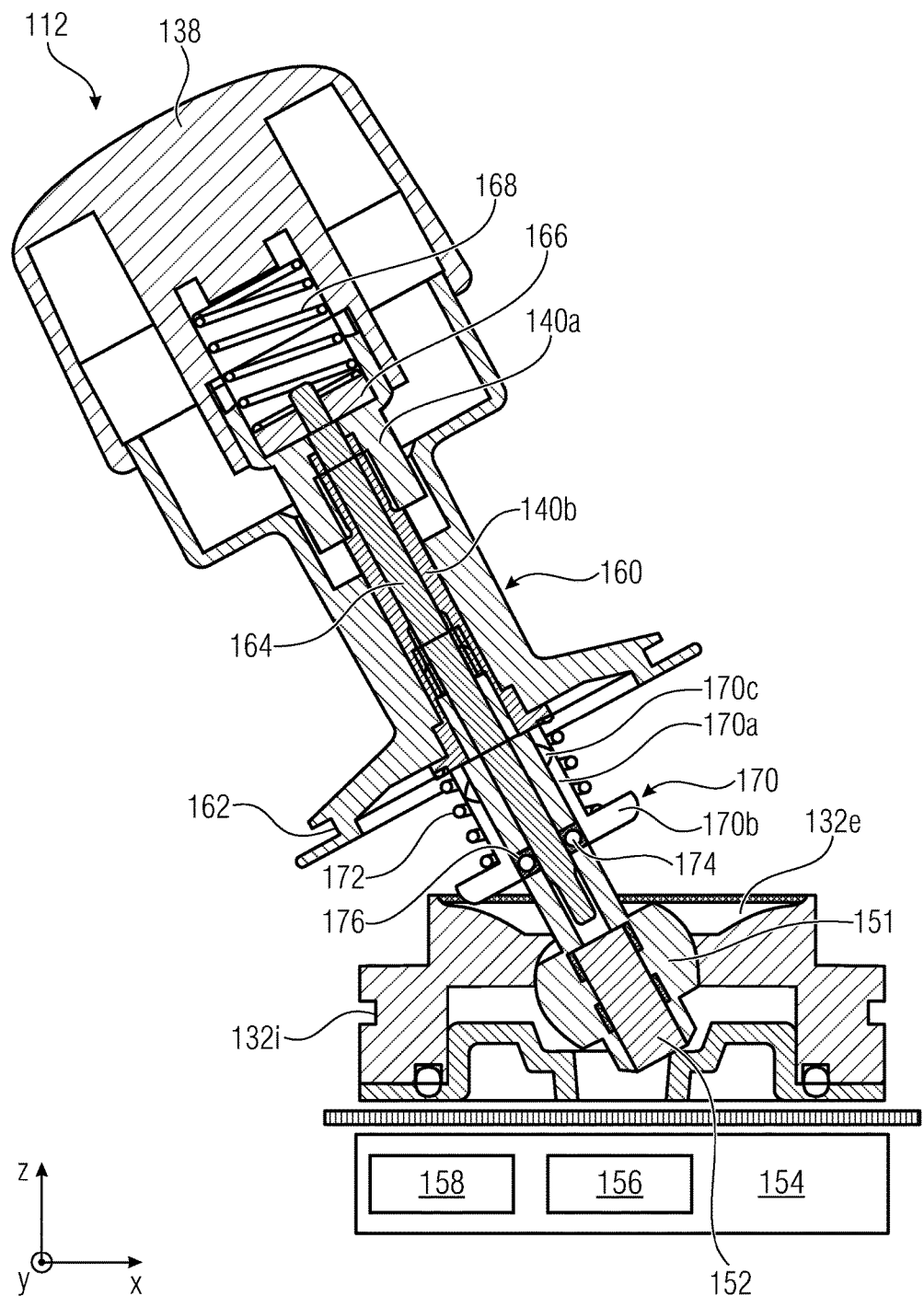

FIG. 5c shows the arrangement described in FIG. 5a with an unlatched locking device 128 and in a position tilted in the plane of movement (x/y-plane). As can be recognized in the movement of the actuation element 126 illustrated in FIG. 5c, actuation of the locking device 128 allows moving the guide 170 towards the knob 38 and at the same time correspondingly compressing the spring element 172. The baseplate 132 comprises the depression 132e mentioned above within which the guide 170 is guided during movement of the actuation element 126. The depression 132e may, for example, be implemented to be cross-shaped so as to comprise portions in the x-direction and portions in the y-direction such that the guide 170 presets a preferential movement of the actuation element 126 in the x- and y-directions within the cross-shaped depression. As may be recognized from FIG. 5c, when the actuation element 126 is deflected, the guide sleeve 170 moves along the oblique surface of the depression 132e towards the locking element 160, thereby, as has been mentioned above, compressing the spring 172. If the actuation element 126 is released, it is, due to the spring force of the spring element 172, brought back to the starting position or center position. Tilting the actuation element 126 causes the guide sleeve 170 to move upwards and the guide pipe 140b to move downwards. The ball 174 is moved again to the opening 176 in the guide pipe wall, but the recess 170c in the guide sleeve 170, due to its upward movement, is not oriented with the hole 176, so that no latching results.

The manually unlatchable locking device 128 arranged at the actuating unit 120 prevents, in the non-actuated state, movement of the actuation element 128 in the x-, y- and/or z-directions. This advantageously prevents an undesired or unwanted operation or movement of the manual control device 112 such that the inventive manual control device is suitable in particular for being used in control and operating units in security-relevant applications, for example lifting work platforms.

In accordance with embodiments, the bellows 130 is implemented advantageously. An upper end 130a of the bellows 130 is arranged in the circumferential depression or groove 162 of the lower end of the frustoconical portion 160a of the locking element. A lower end 130b of the bellows 130 is attached in a corresponding recess or groove 132i which is formed in an outer surface of the portion 132a of the baseplate 132. The bellows 130 is attached detachably to the actuating unit 120 by suitable means and comprises a basically cylindrical shape with diameters which are, over the length of the bellows, basically constant and greater than the diameter of that part of the actuating unit projecting beyond the bellows, for example, of the knob, such that replacing the bellows is easily possible, in particular without demounting the remaining elements of the actuating unit 112. This implementation of the bellows allows easy replacement. In the case of replacement, only the corresponding fixing of the bellows to the elements of the actuating unit has to be released and the bellows may be pulled off upwards, without having to demount other parts of the actuating unit. The new bellows is then similarly pulled over the elements of the actuating unit from above such that replacement, compared to conventional approaches, is considerably easier and less complicated.

Figure 6:
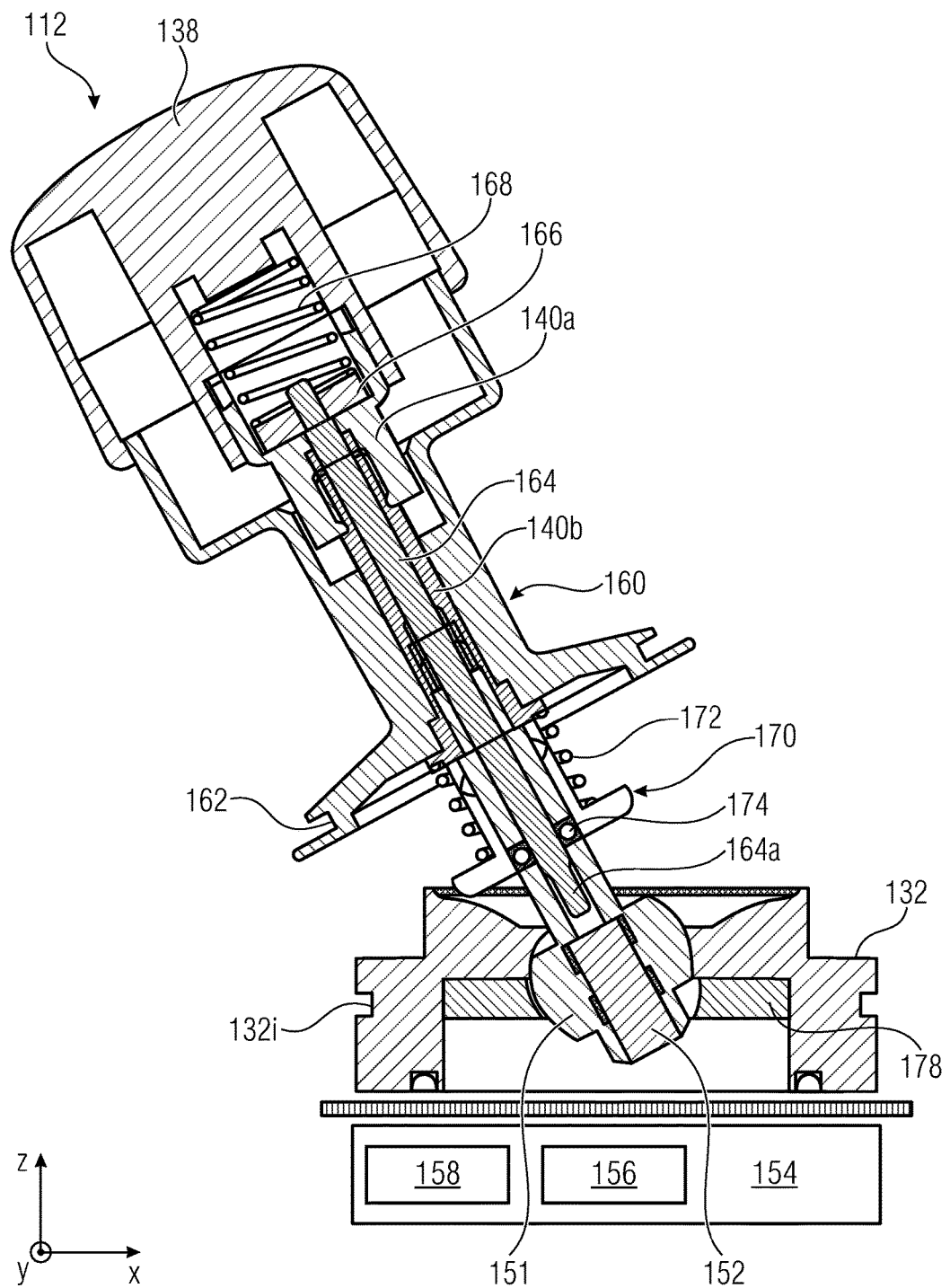
FIG. 6 shows another embodiment of the inventive manual control device the actuation element of which is deflected relative to the central or rest position, and wherein a hold-up plate is mounted instead of an adapter plate.

FIG. 6 shows another embodiment of the inventive manual control device, the actuation element 126 of which is deflected relative to the rest or center position. FIG. 6 illustrates an implementation of the inventive manual control device in which a hold-up plate 178 is mounted in the recess 132g of the baseplate 132, instead of the adapter plate 134 provided in the figures so far. The hold-up plate 178 is arranged within the recess 132g and does not extend in a region below the baseplate 132, in contrast to the adapter plate 134 discussed in greater detail in FIG. 4b.

The hold-up plate 178 may be attached to the baseplate 132 by means of screws or by means of a click-in device, wherein the hold-up plate 178 may be configured to prevent movement of the actuation element 126 and, thus, the corresponding holder 151 with the position element 152 arranged in the z-direction. In other words, this means that, in the case of the mounted hold-up plate 178, as is shown in FIG. 6, movement of the actuation element 126 is possible only in the x- and y-directions, but not the z-direction.

The adapter plate 134 described referring to FIG. 4 and mentioned above allows movement of the actuation element 126 in the z-direction, wherein such a movement is basically also possible when no adapter plate is provided and when the hold-up plate 178 (see FIG. 6) is not mounted. In accordance with embodiments, the adapter plate 134 is used to limit a stroke of the actuation element 126 in the z-direction such that, when actuating the actuation element 126 in the z-direction, an equal change in position of the position element 152 may be detected by the evaluating unit 154. In accordance with the embodiments described referring to FIGS. 3 to 5, the adapter plate 134 is implemented such that the outer portion 134a thereof extends below the lower side of the baseplate 132 (see FIG. 5a) such that, as can be recognized when comparing FIGS. 5 and 6, when using the adapter plate 134, the distance to the sensor unit 156 of the position element 152 is greater than in the case of no adapter plate. Compared to a situation with no adapter plate and with only the hold-up plate 178, the adapter plate 134 thus additionally causes a larger distance to form between the entire actuating unit 120 and, thus, the position element 152 and the evaluating unit 154 and the sensor unit 156 arranged therein, thereby allowing the evaluating unit to find out whether the actuating unit 120 allows a z-axis functionality or not due to its setup.

Instead of using an adapter plate 134, other implementations for locking the actuation element in the z-direction are also conceivable. For example, an integrated arrangement may be provided which comprises a setup similar to the locking device mentioned above and is arranged in the upper region of the guide pipe 140b. In the locked position, the locking device prevents movement in the z-direction. Unlatching allows a movement in the z-direction and may take place like with a ballpoint pen, for example, by turning the knob 138 such that the actuation element, when unlatching, is either moved away from the evaluating unit 154 or towards same. This difference in distance may then be acquired correspondingly by the evaluating unit. In accordance with embodiments, the integrated arrangement may be biased in the latched (second) position such that, with non-actuation, same returns to the latched position and, thus, is suitable particularly for being used in control and operating units in security-relevant applications, for example lifting work platforms.

The embodiments just described relating to a way of either allowing or preventing movement of the actuation element in the z-direction allow the same actuation element to be used, irrespective of whether a movement in the z-direction is desired or not. In both cases, only the manual control device has to be mounted, without further steps being necessary, for example with regard to the evaluating unit. The evaluating unit 154 is configured to recognize whether actuation in the z-direction is allowed or not, based on monitoring the intensity of the signals acquired which changes due to the different distances between the magnetic position element and the sensor with the different positions. This change may be recognized unambiguously. Modification of the evaluating unit is not necessary since the evaluating unit automatically recognizes, using the signals acquired by the magnetic field sensor unit, whether the currently mounted actuating unit of the manual control device allows movement in the z-direction or not.

In the evaluating unit 154 mentioned in the embodiments discussed before, advantageously the regions comprising the sensor unit 156 and the controller 158 are sealed in a watertight and/or airtight manner, wherein the evaluating unit is, for example, surrounded in this region by an electrically non-conductive and non-magnetic encapsulating material. Such an encapsulated implementation protects the evaluating unit 154 and the elements therein from unfavorable environmental influences, for example rain and dust. The evaluating unit 154 may be attached to the lower side of the front plate 122 by gluing, screwing or clicking-in.

Advantageously, the front plate 122 is made of a non-magnetic material, for example a printed circuit board onto which the evaluating unit or its elements are attached and wired, wherein the side facing the actuating unit 120 may be provided with a covering film.

Advantageously, the baseplate 132, the adapter plate 130 and/or the hold-up plate 178 also include a non-magnetic material and are manufactured from, for example, plastic, aluminum or another suitable material.

Although some aspects have been described in connection with a device, it is to be understood that these aspects also represent a description of the corresponding method such that a block or element of a device is to be understood to be also a corresponding method step or a feature of a method step. In analogy, aspects having been described in connection with or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A manual control device for a control and operating unit of a lifting work platform, work machine or construction machine, comprising:
   at least one actuating unit which comprises an actuation element comprising at least one magnetic position element; and
   an evaluating unit which comprises at least one magnetic field sensor unit,
   wherein the evaluating unit is configured to detect a position or movement of the actuation element in a plane of movement based on a sensor signal from the magnetic field sensor unit,
   wherein the actuation element is movable relative to the sensor unit along a further direction of movement perpendicular to the plane of movement,
   wherein the evaluating unit is configured to detect a movement of the actuation element along the further direction of movement based on the sensor signal from the magnetic field sensor unit,
   wherein the actuation element is switchable between:
      a first position in which movement in the plane of movement or movement along the further direction of movement is allowed, and
      a second position in which movement is allowed only in the plane of movement and no movement is allowed along the further direction of movement,
   wherein the evaluating unit is configured to detect the first position or the second position of the actuation element based on the sensor signal from the magnetic field sensor unit,
   wherein the manual control device further includes an adapter plate and a hold-up plate, of which one is mounted in the manual control device, depending on whether the actuation element is in the first position or in the second position,
   wherein, in the second position of the actuation element, the hold-up plate is mounted in the manual control device to prevent movement of the actuation element from the second position, and
   wherein, in the first position of the actuation element, the adapter plate is mounted in the manual control device such that the distance between a non-deflected magnetic position element of the actuation element and the magnetic field sensor unit is greater than the distance when the hold-up plate is mounted.

2. The manual control device in accordance with claim 1, wherein distances between a non-deflected magnetic position element of the actuation element and the magnetic field sensor unit are different in the first position of the actuation element and in the second position of the actuation element.

3. The manual control device in accordance with claim 1, further comprising a movable locking device integrated in the actuation element, the movable locking device being movable between a locked position, in which movement of the actuation element in the further direction of movement is prevented, and an unlocked position in which movement of the actuation element in the further direction of movement is allowed such that distances between a non-deflected magnetic position element of the actuation element and the magnetic field sensor unit are different in the first position of the actuation element and in the second position of the actuation element.

4. The manual control device in accordance with claim 1, wherein the evaluating unit is configured to cause calibration of the manual control device,
wherein the evaluating unit is configured to only perform calibration when the actuation element is within a predetermined region around a zero point.

5. The manual control device in accordance with claim 1, wherein the evaluating unit is configured to indicate, after mounting the actuating unit, a maximum deflection of the actuation element when the actuation element reaches a deflection which is below the maximum deflection by a predetermined value.

6. The manual control device in accordance with claim 5, wherein the evaluating unit is configured to adjust the predetermined value during operation of the manual control device to the maximum deflection of the actuation element.

7. The manual control device in accordance with claim 5, wherein the predetermined value comprises 80% to 90% of the maximum deflection of the actuation element.

8. The manual control device in accordance with claim 1, wherein the actuating unit comprises a manually unlatchable locking device which, in a non-actuated state, prevents the actuation element from being moved.

9. The manual control device in accordance with claim 8, further comprising a guide which cooperates with the manually unlatchable locking device and is movable relative to the actuation element in an actuated state of the manually unlatchable locking device, wherein the manually unlatchable locking device comprises:

a rod comprising a tapering lower end arranged in the region of the guide, wherein the rod is arranged to be movable in a guide pipe of the actuation element received in the guide, and one or several balls arranged between an inner wall of the guide and the rod, wherein the inner wall of the guide comprises one or several recesses for partly receiving the balls, and wherein the guide pipe comprises one or several holes for partly receiving the balls.

10. The manual control device in accordance with claim 9, wherein:
in the non-actuated state of the manually unlatchable locking device, a non-tapering part of the rod is arranged in a region of the holes such that a ball is partly arranged in a hole and extends into a recess in the guide such that movement of the guide and, thus, of the actuation element is not possible, and in the actuated state of the manually unlatchable locking device, a tapering part of the rod is arranged in the region of the holes such that the ball is partly arranged in the hole and extends into the guide pipe such that movement of the guide and, thus, of the actuation element is possible.

11. The manual control device in accordance with claim 1, further comprising a bellows, the bellows comprising a cylindrical shape.

12. The manual control device in accordance with claim 11, wherein the attaching devices comprise screws or click-in devices.

13. The manual control device in accordance with claim 1, wherein the actuating unit includes attaching devices by which the actuating unit is attachable detachably to the control and operating unit, wherein the attaching devices are arranged at the actuating unit such that mounting the actuating unit to the control and operating unit is possible only in a predetermined direction or position.

14. A control and operating unit comprising the manual control device in accordance with claim 1.

15. A lifting work platform, work machine or construction machine comprising the control and operating unit in accordance with claim 14.

* * * * *